United States Patent Office 3,549,683
Patented Dec. 22, 1970

3,549,683
PRODUCTION OF o-CHLORO-
BENZALMALONONITRILE
Jacob Rosin, Maplewood, N.J., assignor to Chris-Craft
 Industries, Inc., a corporation of Delaware
No Drawing. Filed Oct. 7, 1968, Ser. No. 765,673
Int. Cl. C06d 7/00; C07c 121/70
U.S. Cl. 260—465                                    5 Claims

ABSTRACT OF THE DISCLOSURE

The lachrymating agent o-chlorobenzalmalononitrile, which is more commonly known by the code name CS given to this compound by the United States Army Chemical Corps, usually requires careful purification before the compound meets all military specifications. In the production of o-chlorobenzalmalononitrile, in which approximately equimolar amounts of o-chlorobenzaldehyde and malononitrile are reacted under base catalysis, it is possible to use commercial-grade malononitrile and to produce military-grade CS without the usual purification procedures by conducting the reaction in the absence of any solvent and during the course of such reaction sequentially.
(a) allowing the reaction mixture to exothermally reach a temperature in the range from about 35° C. to about 60° C.;
(b) placing the reaction mixture under a reduced pressure greater than about 10 mm. Hg when the temperature of the reaction mixture has exothermally reached the range from about 35° C. to about 60° C.;
(c) heating the reaction mixture while under such partial vacuum to a temperature in the range from about 60° C. to about 105° C. for a period of time sufficient to form at least 80% of the theoretical amount of o-chlorobenzalmalononitrile; and
(d) further decreasing the pressure of the reaction mixture to a level below about 10 mm. Hg while rapidly heating the reaction mixture to a temperature of at least 120° C., thereby forming o-chlorobenzalmalononitrile a melting point in the range of from about 93.4° C. to 95.0° C. which meets all military specifications for CS.

INTRODUCTION

This application relates to the production of o-chlorobenzalmalononitrile, which is a lachrymating agent more commonly known by the code name CS given to this compound by the United States Army Chemical Corps. The invention provides an improved process for manufacturing o-chlorobenzalmalononitrile having a high degree of purity and meeting all military specifications for this compound.

Humans exposed to CS experience severe eye pains, together with burning sensation of the face and upper respiratory passages, violent coughing, nausea and involuntary crying, all of which rapidly incapacitate persons who inhale CS without permanently harming such persons. These symptoms disappear within from 5 to 10 minutes after the exposed individual begins to breathe fresh air again. Because of its effectiveness as a non-lethal lachrymating agent, CS is extensively used in military and police operations.

CS is manufactured by condensing equimolar quantities of o-chlorobenzaldehyde and malononitrile in the presence of a base catalyst (which forms malononitrile carbanion), as shown by the following reaction:

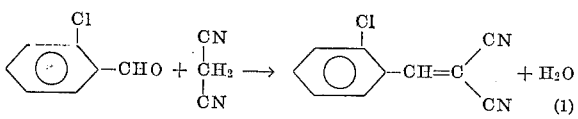

Rigid military and commercial specifications have been established for CS by most governments which include this compound in their chemical warfare arsenal, the common criterion for all such specifications being a high degree of purity. In the United States, these specifications are summarized in MIL–C–51029 (Cml C), dated June 30, 1960. To meet these specifications, the condensation of o-chlorobenzaldehyde and malononitrile is conducted in the presence of a solvent medium from which CS may be recrystallized in pure form. If no solvent medium is used, then CS is obtained in pure form only if very pure raw materials (o-chlorobenzaldehyde and malononitrile) are used in exactly stoichiometric proportions, which is very difficult to achieve on an industrial scale.

STATEMENT OF THE INVENTION

The present invention is based on the discovery that it is possible to produce military-grade CS in the absence of any solvent and using only approximately equimolar quantities of commercial-grade or even poorer quality malononitrile and o-chlorobenzaldehyde when the condensation reaction is conducted so that a partial vacuum is applied after the initial exothermic reaction has occurred and the reaction mixture is heated while under such vacuum until at least 80% (and preferably at least 90%) of the theoretical amount of CS has been formed, following which the vacuum is increased and the reaction mixture rapidly heated to a temperature of at least 120° C. to complete the reaction. The final product has a melting point in the range of from about 93.4° C. to 95.0° C. and, after grinding, meets all military specifications for CS set fourth in MIL–C–51029 (Cml C), dated June 30, 1960.

Based on this discovery, the invention contemplates the improvement in a process for the production of o-chlorobenzalmalononitrile, in which approximately equimolar quantities of o-chlorobenzaldehyde and malononitrile are reacted under base catalysis to form o-chlorobenzalmalononitrile, which comprises conducting the reaction in the absence of any solvent and during the course of such reaction sequentially (a) allowing the reaction mixture to exothermally reach a temperature in the range from about 35° C. to about 60° C.; (b) placing the reaction mixture under a gradually reduced pressure up to about 10 mm. Hg when the temperature of the reaction mixture has exothermally reached the range from about 35° C. to about 60° C.; (c) heating the reaction mixture while under such partial vacuum, to a temperature in the range from about 85° C. to about 105° C. for a period of time sufficient to form at least 80% of the theoretical amount of o-chlorobenzalmalononitrile; and (d) further decreasing the pressure of the reaction mixture to a level below about 10 mm. Hg while rapidly heating the reaction mixture to a temperature of at least 120° C., thereby forming o-chlorobenzalmalononitrile having a melting point in the range of from about 93.4° C.–95.0° C.

PROCESS PARAMETERS

The reaction between o-chlorobenzaldehyde and malononitrile is a Claisen-type condensation which requires base catalysis and which probably proceeds via the formation of the malononitrile carbanion, the addition of this carbanion to the carbonyl carbon atom of o-chlorobenzaldehyde to form a transitory intermediate which undergoes β-elimination of water to form o-chlorobenzalmalononitrile, another name for which is β,β-dicyano-o-chlorostyrene. Any base which is used in Claisen-type condensations may be used in the condensation of o-chlorobenzaldehyde and malononitrile, the preferred catalysts being organic bases which may be volatilized during the final heating of the reaction mixture under vacuum. Such volatile organic bases include piperidine, pyridine and n-butylamine.

To initiate the reaction, approximately equimolar amounts of o-chlorobenzaldehyde and malononitrile are thoroughly mixed together in the presence of a catalytic amount of a base, which may be added during or after the reactants have been mixed. The reaction is initially exothermic, which causes the temperature of the reaction mixture to rise to a level in the range from about 35° C. to about 60° C.

When the temperature of the reaction mixture has exothermally reached the range from about 35° C. to about 60° C., the reaction mixture is placed under a partial vacuum (generally from 10 mm. to 40 mm. Hg) and the reaction mixture is heated while under such partial vacuum to a temperature in the range from about 60° C. to about 105° C. for a period of time sufficient to form at least 80% of the theoretical amount (and preferably much higher) of o-chlorobenzalmalononitrile, which usually requires from about 1 to about 2 hours depending upon the batch size and the particular equipment used.

At this point, a higher vacuum is drawn on the reaction mixture so that the pressure is below 10 mm. and preferably in the range from about 1 mm. to about 5 mm. Hg, and the reaction mixture is rapidly heated to a temperature in the range from about 120° C. to about 140° C. to complete the reaction and vacuum distill off any residual impurities including the base used to catalyze the condensation. The resultant o-chlorobenzalmalononitrile has a high degree of purity (M.P. 93°–95° C.) and may be cast and ground without any further purification or work-up, since the compound meets all military specifications for purity.

The following example is illustrative of the ease with which military-grade o-chlorobenzalmalononitrile may be produced in accordance with the process of the invention:

EXAMPLE

To 66 g. of malononitrile (commercial grade) was added 140.5 g. of o-chlorobenzaldehyde and 170 mg. of piperidine. The temperature of the reaction mixture increased from an initial room temperature (ca. 25° C.) to about 44° C., at which point the pressure on the reaction mixture was reduced to about 20 mm. Hg and the reaction mixture was heated under such partial vacuum. The heating was continued for about 100 minutes, after which time the temperature of the reaction mixture was about 94° C. The vacuum was increased to a level in the range from about 1 mm. to about 5 mm. Hg and the reaction mixture was then rapidly heated to about 125° to 130° C., following which the pressure was returned to atmospheric. The resultant molten material was then cast and ground, yielding 187.2 g. (99.3% of theory) of o-chlorobenzalmalononitrile, M.P. 93.4–95.0° C.

I claim:

1. In a process for the production of the lachrymating agent o-chlorobenzalmalononitrile, in which approximately equimolar amounts of o-chlorobenzaldehyde and malononitrile are reacted under base catalysis to form o-chlorobenzalmalononitrile, the improvement which comprises conducting the reaction in the absence of any solvent and during the course of such reaction sequentially
    (a) allowing the reaction mixture to exothermally reach a temperature in the range from about 35° C. to about 60° C.,
    (b) placing the reaction mixture under a reduced pressure greater than about 10 mm. Hg when the temperature of the reaction mixture has exothermally reached the range from about 35° C. to about 60° C.;
    (c) heating the reaction mixture while under such partial vacuum to a temperature in the range from about 60° C. to about 105° C. for a period of time sufficient to form at least 80% of the theoretical amount of o-chlorobenzalmalononitrile; and
    (d) further decreasing the pressure of the reaction mixture to a level below about 10 mm. Hg, while rapidly heating the reaction mixture to a temperature of at least 120° C., thereby forming o-chlorobenzalmalononitrile having a melting point in the range from about 93° C. to 95° C.

2. A process for the production of o-chlorobenzalmalononitrile according to claim 1, in which the basic catalyst used to catalyze the condensation between the o-chlorobenzaldehyde and the malononitrile is a volatile organic base which substantially completely distills from the reaction mixture during the final heating under vacuum.

3. The process for the production of o-chlorobenzalmalononitrile according to claim 1, in which the reaction mixture is placed under a reduced pressure in the range between 10 mm. and 40 mm. Hg when the temperature of the reaction mixture has exothermally reached the range from about 35° C. to about 60° C.

4. The process for the production of o-chlorobenzalmalononitrile according to claim 1, in which the reduced pressure during the final heating of the reaction mixture is in the range from 1 mm. to 5 mm. Hg.

5. A proces for the production of the lachrymating agent o-chlorobenzalmalononitrile which comprises
    (a) forming a reaction mixture consisting essentially of approximately equimolar amounts of o-chlorobenzaldehyde and malononitrile and a catalytic amount of piperidine, and allowing the reaction mixture to exothermally reach a temperature in the range from about 35° C. to about 60° C.;
    (b) placing the reaction mixture under a reduced pressure in the range from about 10 mm. to about 40 mm. Hg when the temperature of the reaction mixture has exothermally reach the range from about 35° C. to about 60° C.;
    (c) heating the reaction mixture while under such partial vacuum to a temperature in the range from about 85° C. to about 105° C. for a period of time sufficient to form at least 90% of the theoretical amount of o-chlorobenzalmalononitrile; and
    (d) further decreasing the pressure of the reaction mixture to a level in the range from 1 mm. to 5 mm. Hg while rapidly heating the reaction mixture to a temperature of at least 120° C., thereby forming o-chlorobenzalmalononitrile having a melting point in the range from 93° C. to 95° C.

References Cited

UNITED STATES PATENTS

| | | | |
|---|---|---|---|
| 3,250,798 | 5/1966 | Shulgin | 260—465 |
| 3,405,161 | 10/1968 | Proper et al. | 260—465 |
| 3,489,785 | 1/1970 | Kurono et al. | 260—465 |

CHARLES B. PARKER, Primary Examiner

D. H. TORRENCE, Assistant Examiner

U.S. Cl. X.R.

424—304